United States Patent [19]
Borseth et al.

[11] Patent Number: 5,868,964
[45] Date of Patent: *Feb. 9, 1999

[54] CAUSTIC-STABLE MODIFIED POLYCARBOXYLATE COMPOUND AND METHOD OF MAKING THE SAME

[75] Inventors: Donald Borseth, Plymouth; David McCall, Detroit, both of Mich.

[73] Assignee: Diversey Corporation, Mississauga, Canada

[*] Notice: The terminal 35 months of this patent has been disclaimed.

[21] Appl. No.: 778,458

[22] Filed: Oct. 16, 1991

Related U.S. Application Data

[63] Continuation of Ser. No. 78,893, Jul. 29, 1987, abandoned.

[51] Int. Cl.$^6$ ............................ B01F 17/36; B01F 17/52; C11D 1/06
[52] U.S. Cl. .......................... 252/356; 252/312; 510/417; 510/434; 510/435; 526/933
[58] Field of Search ..................................... 252/312, 356; 510/417, 434; 526/933

[56] References Cited

U.S. PATENT DOCUMENTS

| | | | |
|---|---|---|---|
| 3,509,059 | 4/1970 | Renold | 252/174.21 |
| 3,627,686 | 12/1971 | Sabetelli et al. | 510/223 |
| 3,637,563 | 1/1972 | Christena | 523/305 |
| 3,922,230 | 11/1975 | Lamberti et al. | 510/476 |
| 3,956,163 | 5/1976 | Lee | 510/416 |
| 4,132,735 | 1/1979 | Lamberti et al. | 562/582 |
| 4,250,077 | 2/1981 | von Bonin et al. | |
| 4,464,524 | 8/1984 | Karickhoff | 526/313 |
| 4,485,209 | 11/1984 | Fan et al. | 524/801 |
| 4,490,271 | 12/1984 | Spadini et al. | 510/352 |
| 4,533,485 | 8/1985 | O'Connor et al. | 510/435 |
| 4,533,486 | 8/1985 | Scardera et al. | 510/426 |
| 4,559,159 | 12/1985 | Denzinger et al. | 510/434 |
| 4,579,911 | 4/1986 | D'Sidocky et al. | 525/223 |
| 4,826,618 | 5/1989 | Borseth | 252/174.21 |

FOREIGN PATENT DOCUMENTS

| | | |
|---|---|---|
| 6089786 | 5/1986 | Australia . |
| 2835389 | 11/1988 | Australia . |
| 0116930 | 8/1984 | European Pat. Off. . |
| 0134995 | 3/1985 | European Pat. Off. . |
| 5672091 | 6/1981 | Japan . |
| 5672091 | 10/1991 | Japan . |

OTHER PUBLICATIONS 1,126,479 to Diversey Ltd. on Sep. 5, 1968.
2,154,599A toDiversey Corporation (Canada) on Sep. 11, 1985.
2,559,779 to Borseth et al on Feb. 22, 1985.

*Primary Examiner*—Richard D. Lovering
*Attorney, Agent, or Firm*—A. Kate Huffman

[57] ABSTRACT

A surfactant-modified polymer and method of making the same. The surfactant-modified polymer has a polycarboxylate backbone with non-ionic surfactant chemically associated therewith and is formed by the reaction of a reactant compound selected from the group consisting of carboxylic acids, polycarboxylic acids and mixtures thereof in an aqueous media in the presence of a nonionic surfactant.

16 Claims, No Drawings

CAUSTIC-STABLE MODIFIED POLYCARBOXYLATE COMPOUND AND METHOD OF MAKING THE SAME

This is a continuation of the application Ser. No. 07/078,893, filed Jul. 29, 1987 and now abandoned.

BACKGROUND OF THE INVENTION

1. Field of the Invention

This invention relates to a polymeric composition. More particularly, this invention relates to a polymeric compound and method of making the same in which a large amount of nonionic surfactant is incorporated into a polycarboxylate backbone. Even more particularly, this invention relates to a polymeric compound and method of making the same water soluble polyacrylates are modified by the incorporation of large amounts of nonionic surfactant.

2. Description of Relevant Art

To date, little has been done in the field of water soluble polymers. A variety of partially esterified maleic acid copolymers such as those discussed in U.S. Pat. No. 3,591,608 have been synthesized. Such copolymers can be employed in aqueous solutions as emulsion stabilizers. However, partially esterified maleic acid copolymers are highly unstable in the presence of alkali as can be found in highly caustic solutions. In such solutions, these partially esterified maleic acid copolymers tend to hydrolyze to undesirable and non-usable forms. Attempts have been made to stabilize partially esterified maleic acid copolymers. In U.S. Pat. No. 4,633,485 to Scardera, maleic acid is mixed with at least one polyoxyalkylated alcohol in the presence of a free radical initiator and subsequently sulfating the product thus formed to convert a major portion of the terminal hydroxyl groups in the formed product to sulfate groups. The polymeric compound produced is useful as an anionic surfactant in aqueous systems; particularly those containing more than about 10 percent by weight of an alkali metal hydroxide.

Water soluble polymers containing acrylic acid having a molecular weight between about 1,000 and about 1,000,000 have been synthesized. These polyacrylates have been useful in a variety of applications such as thickeners, viscosity regulators, detergency builder replacements, soil suspension agents, dispersing agents, etc. Various attempts have been made to incorporate other compounds with the water soluble polyacrylate polymer. Most attempts resulted in mixtures of the desired compound with the polyacrylate polymer with little or no chemical interaction between the two materials. For example, in U.S. Pat. No. 4,490,271 to Spadini, an admixed solution was formed between a polyacrylate solution having a molecular weight between about 1000 and 20000 and a solution containing polyethylene glycol having a molecular weight between 1000 and 50,000. The mixture is particularly useful in powdered detergent compositions.

U.S. Pat. No. 3,609,069 to Renold teaches that a polymeric dispersing agent can be formed by the in situ polymerization of an appropriate monomer in the presence of nonionic detergents or surfactants. The dispersing agent produced can prevent "salting out" of builder components from liquid detergent compositions. In the Renold process, the monomers employed do not react with the selected nonionic materials during the polymerization reaction. Thus, what is formed is a physical mixture between the two constituents of limited application and practicality. While not wishing to be bound to any theory it is believed that the dispersing agent formed in Renold is a complex polymeric chain with nonionic surfactant physically trapped in voids and interstices created during polymerization. No chemical bonding occurs between the two constituents. Additionally, the Renold patent does not teach the use of low molecular-weight polymers as one of the initial reaction constituents.

It is desirable to develop and provide a polymerization product and process which will provide a modified polymer in which the modified polymer thus formed is a water-soluble polycarboxylate with an appreciable amount of nonionic surfactant chemically associated therewith.

It is also desirable that the modified polymer thus prepared be capable of functioning as an emulsion stabilizer.

It is also desirable that the polymerization process of the present invention be capable of occurring with dilute concentrations of reaction components.

SUMMARY OF THE INVENTION

The present invention is a surfactant-modified polymeric compound and method for making the same. The modified polymeric compound is produced by the following steps:

(a) admixing a suitable reactant selected from the group consisting of acrylic acid, short-chain polycarboxylic acids and mixtures thereof in an aqueous solution with a nonionic or an ethoxylated anionic surfactant;

(b) initiating a reaction between the reactant and the surfactant; and (c) allowing the reaction to proceed until a polymer having a polycarboxylate backbone and at least 0.5 percent, by weight, based on the total weight of the polymer, of surfactant is grafted thereonto.

The modified polycarboxylate compound prepared by the method of the present invention can be used effectively as an anionic surfactant, or an emulsion stabilizer in aqueous media and demonstrates particular stability in alkaline environments.

DETAILED DESCRIPTION OF THE PREFERRED EMBODIMENTS

The present invention is predicated on the discovery that the aqueous polymerization of an acrylic acid or polycarboxylic acid in the presence of an ethoxylated anionic or a nonionic surfactant, under certain reaction conditions, forms a modified water-soluble polymer which is caustic-stable and can function as an emulsion stabilizer.

The present invention includes a method for preparing a surfactant-modified polymeric compound comprising the steps of:

(a) admixing an ethoxylated anionic or nonionic surfactant with an aqueous solution containing a reactant compound selected from the group consisting of acrylic acid, short-chain polycarboxylic acids and mixtures thereof in an aqueous solution;

(b) initiating a reaction in the aqueous solution containing the surfactant and the reactant compound; and (c) allowing the reaction to proceed until a modified polymer is produced having a polycarboxylate backbone and at least 0.5 percent by weight of surfactant, based on the total weight of the modified polymer grafted thereonto.

The present invention contemplates the use of a reactant compound selected from the group consisting of acrylic acid, short-chain polycarboxylic acid and mixtures. thereof. The polycarboxylic acid employed in the present invention has one of the general formulae:

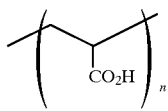

where n is at least 2; and

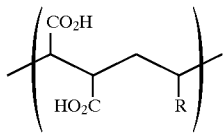

where n is an integer between about 2 and about 500 and R is selected from the group consisting of hydrogen, phenyl, carboxylates, methoxy and mixtures thereof.

Examples of suitable polycarboxylic acids include polyacrylic acid, copolymers of maleic anhydride and methylvinyl ether, copolymers of maleic anhydride and ethylene copolymers of maleic anhydride and styrene, copolymers of maleic anhydride and acrylic acid. Generally, the polycarboxylic acids will have a molecular weight between about 5,000 and 200,000 and, preferably, between about 20,000 and 100,000. In practicing the present invention, the preferred reactant compound is acrylic acid.

The reactant compound is present in the aqueous solution in a concentration between about 1.0 percent and about 40.0 percent by weight based on the total weight of the aqueous solution. Where acrylic acid is employed as the reactant compound, it is present in an amount ranging between about 1.0 and 15.0 percent by weight based on the total weight of the aqueous solution and is preferably present in an amount ranging between about 3.0 and 13.0 percent. Where a short-chain polycarboxylic acid is employed, the polycarboxylic acid is present in an amount ranging between about 7.0 percent to about 40.0 percent and preferably, between about 20.0 and about 35.0 percent by weight based on the total weight of the aqueous solution.

The surfactant is admixed with the aqueous solution containing the reactant compound at a temperature ranging from about ambient to about 70° C. The surfactant is present in the solution in an amount ranging between about 0.4 percent by weight and about 46.0 percent by weight based on the total weight of the aqueous solution. Preferably, the surfactant is employed in an amount ranging from between about 2.0 percent and about 7.0 percent, based on the total weight of the aqueous solution. It should be noted, though, that the amount of nonionic surfactant employed will vary depending on the desired end use for the surfactant-modified polymeric compound. For example, in aqueous solutions containing low levels of immiscible materials, surfactant-modified polymers having low levels of surfactant incorporated therewith can be used to maintain stable aqueous emulsions. Where higher levels of immiscible materials are employed, modified polymers containing higher levels of surfactant may be necessary to maintain stable emulsions.

As noted, the surfactant employed herein is either a nonionic or an ethoxylated anionic surfactant.

Representative of the useful nonionic surfactants are alcohol ethoxylates, alkyl aryl ethoxylates and alkylene oxide adducts of polyhydric compounds. Suitable alcohol ethoxylates include, for example, the ethylene oxide adducts of monohydric alcohols, having at least 9 carbon atoms in the alkyl portion, and at least 6 moles of ethylene oxide. These alcohol ethoxylates are well known and commercially available such as those sold commercially under the name NEODOL and TERGITOL.

Useful alkyl aryl ethoxylates include for example, thoxylated octyl phenols, ethoxylated nonyl phenols, ethoxylated dodecyl phenol*, ethoxylated dinonyl phenols, as well as mixtures thereof. Ordinarily, these nonionic surfactants have about at least nine moles of ethylene oxide in the ethoxylate portion. Again, these surfactants are well known and commercially available, such as those sold under the names IGEPAL, TERGITOL and ICONOL.

The alkylene oxide adducts of polyhydric compounds are, also, well known and generally comprise the ethylene oxide and/or ethylene oxide propylene oxide adducts of propylene glycol, ethylene diamine and the like. These products are respectively sold under the trademark PLURONIC and TETRONIC by BASF CORPORATION.

Representative of the ethoxylated anionic surfactants are the ethylene oxide adducts of phosphate esters sold under the name KLEARFAC by BASF CORPORATION.

In selecting any of the useful surfactants it is to be understood that they must be water-soluble under the reaction conditions. Ordinarily, such surfactants will have a cloud point ranging from about 55° C. to about 100° C.

While any of the above-described surfactants can be used herein, preferably, the surfactant is either an alcohol ethoxylate, an alkyl aryl ethoxylate, or mixtures thereof, having the requisite properties denoted above.

In forming the stabilizer either one of two reactions occur. First, where acrylic acid is employed a polymerization reaction is conducted in the aqueous solution. Where the polycarboxylate is employed, the surfactant is grafted onto the polycarboxylate. In either occurrence, a chemical initiator is added to the aqueous solution containing the surfactant and the reactant compound to begin the reaction.

The initiator is generally an oxidizing agent selected from the group consisting of alkali metal persulfates, ammonium persulfates, azobis-(isobutyronitrile), t-butyl hydroperoxide and mixtures thereof. Preferably, the initiator is selected from the group consisting of sodium persulfate, potassium persulfate and mixtures thereof.

The concentration of initiator used in the reaction is related to the desired molecular mass of the surfactant-modified polymer to be generated. In general, the surfactant-modified polymer produced by the method of the present invention has a relatively low molecular mass, i.e. between about 5,000 and about 200,000. To achieve a molecular mass in this range the amount of initiator employed is at least 0.1 percent by weight based on the total solution concentration. Preferably, the amount of initiator employed to obtain a polymer having a molecular mass between about 5,000 and about 200,000 is between about 0.1 and about 2.5 percent by weight based on the total weight of the solution. It is to be appreciated that, where surfactant-modified polymers having higher molecular mass are desired, smaller amounts of initiator can be used.

The initiator/oxidizing agent can be used independently or can be coupled with a reducing agent. Examples of suitable reducing agents include hydrogen peroxide, alkyl hydroperoxides, alkali metal bisulfites and mixtures thereof. The preferred reducing agents are selected from the group consisting of hydrogen peroxide, sodium bisulfite and mixtures thereof. Where used, the reducing agent is present in a weight ratio to initiator of from 1:1 to 1:2.

The polymerization or grafting reaction preferably occurs in an acidic solution having a pH between the natural pH of acrylic acid or polyacrylic acid (about 2.3) and about 6.0. Various agents can be added to partially neutralize the acidity of the solution and maintain solution pH at the desired level. These agents are generally alkali metal hydroxides; with sodium hydroxide being preferred.

The polymerization or grafting generally occurs at a reaction temperature between about 100° F. and about 212°

F. (about 38° C.to about 100° C.) over a period between about 30 minutes and about 24 hours. Preferably the solution temperature is maintained at a first temperature between about 100° F and about 160° F. (about 38° C. to about 88° C.) for a period between about one minute and about 30 minutes. This temperature can be achieved and maintained by the external addition of heat. Throughout this period the solution is, preferably, mixed to maintain even heating.

The addition of the chemical initiator generates an exotherm which maintains the reaction temperature.

Without being bound by any theory, it appears that the modified polymer produced by the method of the present invention has a polycarboxylate backbone with about 0.5 to about 17.0 percent by weight of surfactant, based on the total weight of the polymer, is grafted onto the backbone. The surfactant-modified polymer produced by the process of the present invention is, at least, partially water-soluble and is maintained in an aqueous solution at a concentration between about 1.0 and about 40.0 percent by weight, based on the total weight of the solution, when used as a phase stabilizer.

Alternatively, the polymer can be recovered and employed as an anhydrous compound using conventional recovery techniques.

The surfactant-modified polymer of the present invention exhibits a high degree of caustic stability at pH levels as high as 15, in caustic solutions.

To further understand the present invention, reference is made to the following illustrative examples which are not to be construed as limitative of the present invention. In the Examples all parts are by weight, absent contrary indications.

EXAMPLE I

This example illustrates the preparation of an mulsion stabilizer in accordance herewith by the polymerization of acrylic acid.

A polymeric compound was synthesized in the following manner: Five parts of acrylic acid, 3.0 parts of a 15 mole ethylene oxide adduct of nonyl phenol nonionic surfactant commercially available from GAF Corporation under the trade name IGEPAL CO-730 and 0.7 parts of sodium hydroxide were dissolved in sufficient water to yield a 100 part aqueous solution. The solution was stirred and heated to 60° C. One part of sodium persulfate was, then, added thereto. After several minutes an exotherm was apparent with a temperature rise to 75° C. Stirring was continued for 90 minutes while the temperature was maintained at 75° C.

At the end of this interval, the solution was tested for unreacted alkene using the Bayer test.

The resulting solution was cooled and exhibited a clear, yellowish color and was slightly acidic. This solution was denoted as SAMPLE A.

EXAMPLE II

This example illustrates the preparation of a phase stabilizer in accordance herewith by grafting a surfactant onto a polycarboxylate backbone.

In a suitable reaction vessel, sixty parts of an aqueous solution containing 30 parts by weight poly(acrylic acid) and commercially available as GOODRITE 722 from B. F. Goodrich Corp. was diluted with water to yield 97 parts of total solution. Three-parts of the same nonionic surfactant used in Example I and 1 part of sodium persulfate were dissolved in this solution. The resulting solution was stirred and maintained at a temperature of 70° C. for 24 hours. The resulting solution was, then, cooled to room temperature.

The resulting solution was clear and slightly yellowish and was slightly acidic.

EXAMPLE III

This example illustrates the test method employed to determine that grafting of the surfactant onto the backbone occurs.

In order to separate unreacted nonionic surfactant from the polycarboxylate, 100 parts of the aqueous acidic solution of modified poly(acrylic acid) of Example I was made basic (to about pH equal to 10) with a 50 percent sodium hydroxide solution. The solution became viscous with this addition.

One hundred milliliters of methanol were slowly added to the clear viscous solution. A white gummy precipitate was formed. The solution was decanted from the precipitate and the precipitate was washed with two fresh aliquots of methanol. The washed precipitate was dried at 110° C. for 12 hours. The methanol fractions were combined and extracted with methylene chloride and the methylene chloride fractions were combined and evaporated.

The precipitate was, then, titrated for acrylic acid. The precipitate was found to contain the acrylic acid residues. The residues were quantified. The remainder was assumed to be nonionic surfactant grafted to the polymer. The fraction soluble in methylene chloride was analyzed by conventional ultraviolet and infrared analytic techniques and was shown to contain free nonionic surfactant.

For comparison, a physical mixture of 20 parts of poly (acrylic acid) and 3 parts of the same nonionic surfactant used in Example I was admixed in 76 parts of water. No polymerization reaction was permitted to proceed.

The analytical procedure outlined above was repeated on this sample. The results of the testing on the product of Example I designated SAMPLE A and the comparative product, designated SAMPLE B, are outlined in Table I.

As can be seen from the data collected in Table I, all of the sodium polyacrylate should have been, and was, found in the methane insoluble fraction; while any unbound nonionic surfactant should be found in the methylene chloride soluble fraction. In the polymer prepared according to the present invention, one-sixth of the nonionic surfactant was found in the methylene insoluble fraction, indicating grafting between the sodium polyacrylate and the nonionic surfactant.

TABLE I

AMOUNT OF COMPONENTS FOUND IN RESPECTIVE FRACTIONS

|  | Sample A | | Sample B | |
| --- | --- | --- | --- | --- |
|  | Charged | Found | Charged | Found |
| Methanol insoluble fraction | | | | |
| Sodium polyacrylate | 7.4 | 8.5 | 7.4 | 7.4 |
| Nonionic surfactant | 3.0 | 0.5 | 3.0 | 0.0 |
| Methylene chloride soluble fraction | | | | |
| Sodium polyacrylate | 7.4 | 0.0 | 7.4 | 0.0 |
| Nonionic surfactant | 3.0 | 2.5 | 3.0 | 3.0 |

The surfactant-modified polymers hereof exhibit excellent utility as phase stabilizers in highly caustic detergent emulsions, containing both low and high concentrations of nonionic surfactants, as described in copending U.S. patent application Ser. No. 071,619 filed Jul. 9, 1987and now U.S.

Pat. No. 4,826,618, the disclosure of which is hereby incorporated by reference.

In addition, these phase stabilizers produced hereby evidence utility as an emulsion stabilizer, per se.

Having, thus, described the invention what is claimed is:

1. A surfactant modified polymeric emulsion detergent stabilizer consisting essentially of:
   (a) from about 2 to 7 percent, by weight, based on the total weight of the stabilizer, of a non-ionic surfactant;
   (b) from about 3 to 35 percent, by weight, based on the total weight, of a polycarboxylic acid;
   (c) at least 58 percent water, by weight, based on the total weight; and
   wherein at least 0.5 percent, by weight, based on the total polymer weight, of the non-ionic surfactant is grafted onto the acid, the acid defining a polymeric backbone.

2. The surfactant-modified polymeric emulsion stabilizer of claim 1 wherein the polycarboxylic acid polymeric backbone is selected from the group consisting of acrylic acid, methacrylic acid, polyacrylic acid, copolymers of maleic anhydride and methylvinyl ether, copolymers of maleic anhydride and ethylene, copolymers of maleic anyhydride and styrene, copolymers of maleic anhydride and acrylic acid and mixtures thereof.

3. The surfactant-modified polymeric emulsion stabilizer of claim 1 wherein the polycarboxylic acid polymeric backbone is selected from the group consisting of acrylic acid, methacrylic acid, polyacrylic acid, copolymers of maleic anhydride and ethylene, and mixtures thereof.

4. The surfactant-modified polymeric emulsion stabilizer of claim 1 wherein the polycarboxylic acid polymeric backbone is selected from the group consisting of acrylic acid, polyacrylic acid and mixtures thereof.

5. The surfactant-modified polymeric emulsion stabilizer of claim 4 wherein the polycarboxylic acid polymeric backbone has a molecular weight less than about 100,000.

6. The surfactant-modified polymeric emulsion stabilizer of claim 5 wherein the polycarboxylic acid polymeric backbone has a molecular weight less than about 50,000.

7. The surfactant-modified polymeric emulsion stabilizer of claim 1 wherein the polyearboxylic acid polymeric backbone is polycarboxylic acid present in an amount between about 20.0 and about 35.0 percent by weight, based on the total weight of the unpolymerized solution.

8. The surfactant-modified polymeric emulsion stabilizer of claim 1 wherein the non-ionic surfactant is selected from the group consisting of alcohol ethoxylates, alkyl aryl ethoxylates, condensation products of ethylene oxide and propylene oxide, ethylene oxide/propylene oxide adducts of ethylene diamine, and mixtures thereof.

9. The surfactant-modified polymeric emulsion stabilizer of claim 8 wherein the non-ionic surfactant is selected from the group consisting of alcohol ethoxylates, alkyl aryl ethoxylates, and mixtures thereof.

10. The surfactant-modified polymeric emulsion stabilizer of claim 9 wherein the non-ionic surfactant is selected from the group consisting of nonyl phenol ethoxylates.

11. The surfactant-modified polymeric emulsion stabilizer of claim 1 having a molecular mass between about 5,000 and about 200,000.

12. A surfactant-modified polymeric emulsion stabilizer which is produced by reacting (a) from about 0.1 to about 2.5 weight percent of an initiator selected from the group consisting of alkali metal persulfates, ammonium persulfates, azobis-(isobutyronitriles), t-butyl hydroperoxide and mixtures thereof with (b) from about 3 to about 35 weight percent of a polycarboxylic polymeric backbone and (c) from about 2.0 to about 7.0 weight percent of either an ethoxylated anionic surfactant or a non-ionic surfactant, the reacting being carried out in at least about 58 weight percent of water, the reaction proceeding at a temperature of 100° F. to 212° F. for a period of time ranging from between about 30 minutes and about 24 hours and a pH of between 2.3 and 6.0.

13. The surfactant-modified polymeric emulsion stabilizer of claim 12 wherein the surfactant is selected from the group consisting of alcohol ethoxylates, alkyl aryl ethoxylates, condensation products of ethylene oxide and propylene oxide, ethylene oxide/propylene oxide adducts of ethylene diamine, propylene oxide-ethylene oxide adducts of phosphate esters and mixtures thereof.

14. The surfactant modified polymeric emulsion stabilizer of claim 12 wherein the polycarboxylic polymeric backbone is selected from the group consisting of carboxylic acid, polycarboxylic acid and mixtures thereof in an aqueous media.

15. The surfactant-modified polymeric emulsion stabilizer of claim 14 wherein the polycarboxylic polymer backbone is selected from the group consisting of: acrylic acid, methacrylic acid, polyacrylic acid, copolymers of maleic anhydride and methylvinyl ether, copolymers of maleic anhydride and ethylene, copolymers of maleic anyhydride and styrene, copolymers of maleic anhydride and acrylic acid and mixtures thereof.

16. The surfactant modified polymeric emulsion stabilizer of claim 12 wherein the initiator is combined with a reducing agent, the initiator and reducing agent being present in a respective weight ratio of about 1:1 to about 2:1.

* * * * *